(12) United States Patent
Chiu et al.

(10) Patent No.: US 12,305,309 B2
(45) Date of Patent: May 20, 2025

(54) COMPOSITE METAL FOIL

(71) Applicant: Industrial Technology Research Institute, Hsinchu (TW)

(72) Inventors: Chiu-Yen Chiu, Hsinchu County (TW); Li-Ju Chen, Hsinchu (TW); Sheng-Hui Wu, Hsinchu (TW); Chia-Chen Fang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 17 days.

(21) Appl. No.: 18/156,365

(22) Filed: Jan. 18, 2023

(65) Prior Publication Data

US 2024/0167185 A1 May 23, 2024

(30) Foreign Application Priority Data

Nov. 18, 2022 (TW) ................. 111144218

(51) Int. Cl.
  *C25D 7/06* (2006.01)
  *B32B 15/01* (2006.01)
  (Continued)

(52) U.S. Cl.
  CPC ............ *C25D 7/0614* (2013.01); *B32B 15/01* (2013.01); *B32B 15/013* (2013.01);
  (Continued)

(58) Field of Classification Search
  CPC .......... C25D 7/0614; C25D 1/04; C25D 3/22; C25D 3/30; C25D 3/38; C25D 3/46; C25D 5/10; C25D 5/12; C25D 5/48; C25D 5/50; C25D 5/605; H01M 4/00; H01M 4/134; H01M 4/661; H01M 4/13; H01M 4/139; H01M 4/667; Y02E 60/10; B32B 15/01; B32B 15/013; B32B 15/018; B32B 15/04;
  (Continued)

(56) References Cited

U.S. PATENT DOCUMENTS

| | | |
|---|---|---|
| 7,258,950 B2 | 8/2007 | Tamura et al. |
| 9,398,397 B2 | 7/2016 | Petersen et al. |

(Continued)

FOREIGN PATENT DOCUMENTS

| | | |
|---|---|---|
| CN | 102912317 | 2/2013 |
| CN | 103904300 | 7/2014 |

(Continued)

OTHER PUBLICATIONS

Panpan Zhang et al., "Mechanical properties of Li—Sn alloys for Li-ion battery anodes: A first-principles perspective", AIP Advances, Jan. 13, 2016, pp. 1-7.

(Continued)

*Primary Examiner* — Michael E. La Villa
(74) *Attorney, Agent, or Firm* — JCIPRNET

(57) ABSTRACT

A composite metal foil and a method of manufacturing the same are provided. The composite metal foil includes at least a first metal layer and a second metal layer. The first metal layer is copper foil, nickel foil, stainless steel foil, or a combination thereof. The second metal layer is disposed on a surface of the first metal layer. A contact angle of a surface of the second metal layer to liquid lithium metal is lower than 90 degrees.

7 Claims, 11 Drawing Sheets

(51) Int. Cl.
| | |
|---|---|
| B32B 15/04 | (2006.01) |
| B32B 15/18 | (2006.01) |
| B32B 15/20 | (2006.01) |
| C23C 2/06 | (2006.01) |
| C23C 2/08 | (2006.01) |
| C23C 2/26 | (2006.01) |
| C23C 2/28 | (2006.01) |
| C23C 2/40 | (2006.01) |
| C23C 28/00 | (2006.01) |
| C23C 28/02 | (2006.01) |
| C23C 30/00 | (2006.01) |
| C25D 1/04 | (2006.01) |
| C25D 3/22 | (2006.01) |
| C25D 3/30 | (2006.01) |
| C25D 3/38 | (2006.01) |
| C25D 3/46 | (2006.01) |
| C25D 5/00 | (2006.01) |
| C25D 5/10 | (2006.01) |
| C25D 5/12 | (2006.01) |
| C25D 5/48 | (2006.01) |
| C25D 5/50 | (2006.01) |
| H01M 4/00 | (2006.01) |
| H01M 4/13 | (2010.01) |
| H01M 4/134 | (2010.01) |
| H01M 4/139 | (2010.01) |
| H01M 4/66 | (2006.01) |

(52) U.S. Cl.
CPC ............ *B32B 15/018* (2013.01); *B32B 15/04* (2013.01); *B32B 15/043* (2013.01); *B32B 15/18* (2013.01); *B32B 15/20* (2013.01); *C23C 2/06* (2013.01); *C23C 2/08* (2013.01); *C23C 2/26* (2013.01); *C23C 2/28* (2013.01); *C23C 2/40* (2013.01); *C23C 28/02* (2013.01); *C23C 28/021* (2013.01); *C23C 28/023* (2013.01); *C23C 28/025* (2013.01); *C23C 28/028* (2013.01); *C23C 28/32* (2013.01); *C23C 28/325* (2013.01); *C23C 30/00* (2013.01); *C23C 30/005* (2013.01); *C25D 1/04* (2013.01); *C25D 3/22* (2013.01); *C25D 3/30* (2013.01); *C25D 3/38* (2013.01); *C25D 3/46* (2013.01); *C25D 5/10* (2013.01); *C25D 5/12* (2013.01); *C25D 5/48* (2013.01); *C25D 5/50* (2013.01); *C25D 5/605* (2020.08); *H01M 4/00* (2013.01); *H01M 4/13* (2013.01); *H01M 4/134* (2013.01); *H01M 4/139* (2013.01); *H01M 4/661* (2013.01); *H01M 4/667* (2013.01); *Y02E 60/10* (2013.01); *Y10T 428/12431* (2015.01); *Y10T 428/12438* (2015.01); *Y10T 428/12458* (2015.01); *Y10T 428/12556* (2015.01); *Y10T 428/12708* (2015.01); *Y10T 428/12715* (2015.01); *Y10T 428/12722* (2015.01); *Y10T 428/12792* (2015.01); *Y10T 428/12799* (2015.01); *Y10T 428/12806* (2015.01); *Y10T 428/12819* (2015.01); *Y10T 428/12826* (2015.01); *Y10T 428/12868* (2015.01); *Y10T 428/12875* (2015.01); *Y10T 428/12882* (2015.01); *Y10T 428/12896* (2015.01); *Y10T 428/1291* (2015.01); *Y10T 428/12917* (2015.01); *Y10T 428/12931* (2015.01); *Y10T 428/12944* (2015.01); *Y10T 428/12979* (2015.01); *Y10T 428/12993* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(58) Field of Classification Search
CPC ....... B32B 15/043; B32B 15/18; B32B 15/20; Y10T 428/12458; Y10T 428/12431; Y10T 428/12708; Y10T 428/12715; Y10T 428/12722; Y10T 428/12799; Y10T 428/12792; Y10T 428/12806; Y10T 428/12819; Y10T 428/12826; Y10T 428/12868; Y10T 428/12875; Y10T 428/12882; Y10T 428/12896; Y10T 428/1291; Y10T 428/12917; Y10T 428/12931; Y10T 428/12944; Y10T 428/12979; Y10T 428/12993; Y10T 428/12556; Y10T 428/24967; Y10T 428/2495; Y10T 428/263; Y10T 428/264; Y10T 428/265; C23C 30/00; C23C 30/005; C23C 2/06; C23C 2/08; C23C 2/26; C23C 2/28; C23C 2/40; C23C 28/02; C23C 28/021; C23C 28/023; C23C 28/025; C23C 28/028; C23C 28/32; C23C 28/325
See application file for complete search history.

(56) References Cited

U.S. PATENT DOCUMENTS

| | | | |
|---|---|---|---|
| 10,784,497 B2 | 9/2020 | Holme et al. | |
| 2002/0168572 A1* | 11/2002 | Tamura | H01M 4/38 429/231.95 |
| 2019/0157723 A1 | 5/2019 | Suzuki et al. | |
| 2020/0075990 A1 | 3/2020 | Park et al. | |
| 2020/0099046 A1 | 3/2020 | Muldoon | |

FOREIGN PATENT DOCUMENTS

| | | |
|---|---|---|
| CN | 105813839 | 7/2016 |
| CN | 108550858 | 9/2018 |
| CN | 108893763 | 11/2018 |
| CN | 109742323 | 5/2019 |
| CN | 110504454 | 11/2019 |
| CN | 110752375 | 2/2020 |
| CN | 110952065 | 4/2020 |
| CN | 111969212 | 11/2020 |
| CN | 112216809 | 1/2021 |
| CN | 112670516 | 4/2021 |
| CN | 113036153 | 6/2021 |
| CN | 113056838 | 6/2021 |
| JP | H1197030 | 4/1999 |
| JP | 2002151056 | 5/2002 |
| JP | 2012057207 | 3/2012 |
| TW | 201531174 | 8/2015 |
| TW | I553946 | 10/2016 |
| TW | 201936993 | 9/2019 |
| WO | 2018025594 | 2/2018 |
| WO | 2020072524 | 4/2020 |
| WO | 2021034907 | 2/2021 |

OTHER PUBLICATIONS

Vikram Pande et al., "Computational Screening of Current Collectors for Enabling Anode-Free Lithium Metal Batteries", ACS Energy Lett., Nov. 11, 2019, pp. 2952-2959.
Jiangyan Wang et al., "Fundamental study on the wetting property of liquid lithium", Energy Storage Materials, May 23, 2018, pp. 345-350.
B. Yan et al., "Electrochemical Properties of Lithium-Rich Li—Cu Alloy Anode Prepared by Electrodeposition for Lithium Batteries", Advances in Material Chemistry, with English abstract, Apr. 2014, pp. 1-8.

(56) References Cited

OTHER PUBLICATIONS

"Office Action of Taiwan Counterpart Application", issued on Jan. 8, 2024, p. 1-p. 5.

* cited by examiner

Comparative example

Example 1

Example 2

Comparative example

Example 3

Example 4

Comparative example

Example 5

Comparative example

Example 6

Example 7

Comparative example

Example 10

Comparative example

Example 6

Example 8

Example 9

Example 11

COMPOSITE METAL FOIL

CROSS-REFERENCE TO RELATED APPLICATION

This application claims the priority benefit of Taiwan application serial no. 111144218, filed on Nov. 18, 2022. The entirety of the above-mentioned patent application is hereby incorporated by reference herein and made a part of this specification.

TECHNICAL FIELD

The disclosure relates to a composite metal foil and a method of manufacturing the same.

BACKGROUND

At present, commercially available lithium-ion cell copper foil only has a function of collecting electricity, and its main demands are high conductivity, roughness, thinning, high strength, high elongation, etc., and these characteristics are mainly mechanical properties of the foil itself.

When a negative electrode of a lithium cell is lithium metal or the lithium cell is an anode-free lithium metal cell, a current collector is no longer just responsible for collecting electricity, but also affects a deposition morphology of the lithium metal, and different lithium metal deposition morphology may directly affect a cell cycle life, safety, etc. In other words, a role of the current collector in high-energy cells will be even more critical.

SUMMARY

The disclosure provides a composite metal foil with a lithiophilic surface, which is expected to be used in a lithium cell, such as an anode-free lithium metal cell, and has an improved electrode surface.

The disclosure provides a method of manufacturing a composite metal foil, which is adapted to form a lithiophilic layer on a surface of a metal foil, and form an alloy layer between metal layers.

A composite metal foil of the disclosure includes at least a first metal layer and a second metal layer. The first metal layer is a copper foil, a nickel foil, a stainless steel foil, or a combination thereof. The second metal layer is disposed on a surface of the first metal layer. A contact angle of a surface of the second metal layer to liquid lithium metal is lower than 90 degrees.

A method of manufacturing a composite metal foil of the disclosure includes the following. A first metal layer is provided. The first metal layer is a copper foil, a nickel foil, a stainless steel foil, or a combination thereof. Then, a second metal layer is formed on a surface of the first metal layer through electroplating. A contact angle of a surface of the second metal layer to liquid lithium metal is lower than 90 degrees.

Based on the above, in the disclosure, the lithiophilic second metal layer is electroplated on the surface of the first metal layer, thereby improving a lattice arrangement behavior during lithium nucleation, and further affecting the lithium deposition morphology, which helps to improve the characteristics of the lithium metal cell.

In order for the aforementioned features of the disclosure to be more comprehensible, several embodiments accompanied with drawings are described in detail as follows.

DETAILED DESCRIPTION OF DISCLOSURED EMBODIMENTS

Figure 1:
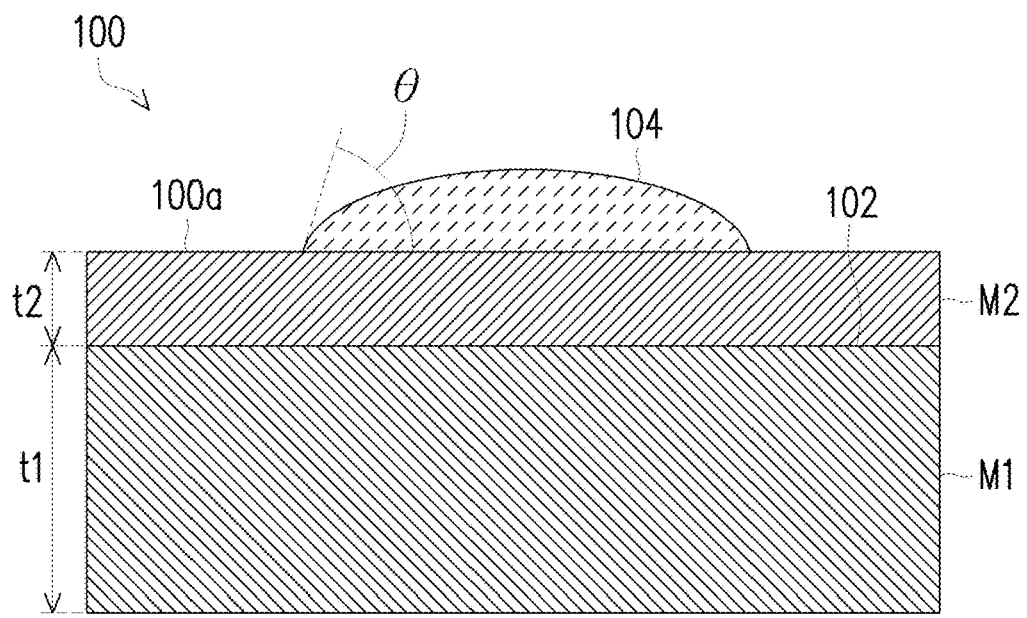
FIG. 1 is a schematic cross-sectional view of a composite metal foil according to a first embodiment of the disclosure.

FIG. 1 is a schematic cross-sectional view of a composite metal foil according to a first embodiment of the disclosure.

Referring to FIG. 1, a composite metal foil 100 includes at least a first metal layer M1 and a second metal layer M2. In an embodiment, a surface roughness Rz of the composite metal foil 100 is ≤2 μm. The first metal layer M1 can be a copper foil, a nickel foil, a stainless steel foil, or a combination thereof. In an embodiment, a thickness t1 of the first metal layer M1 is, for example, 3 μm to 30 μm. The second metal layer M2 is disposed on a surface 102 of the first metal layer M1, where contact angle θ of a surface 100a of the second metal layer M2 to a liquid lithium metal 104 is lower than 90 degrees; in other words, the second metal layer M2 may be referred to as a "lithiophilic" layer or a "lithiophilic" coating. For example, the second metal layer M2 is, for example, Sn, In, Ag, Zn, ZnO, zinc alloy, tin alloy, indium alloy, or a combination thereof. In an embodiment, a thickness t2 of the second metal layer M2 is, for example, 5 nm to 500 nm. The second metal layer M2 may consist of a plurality of metal particles discontinuously distributed on the surface 102 of the first metal layer M1, and each metal particle is island-shaped or irregular, but for clarity's sake, only a single layer is shown in FIG. 1, and details thereof are not drawn.

Figure 2:
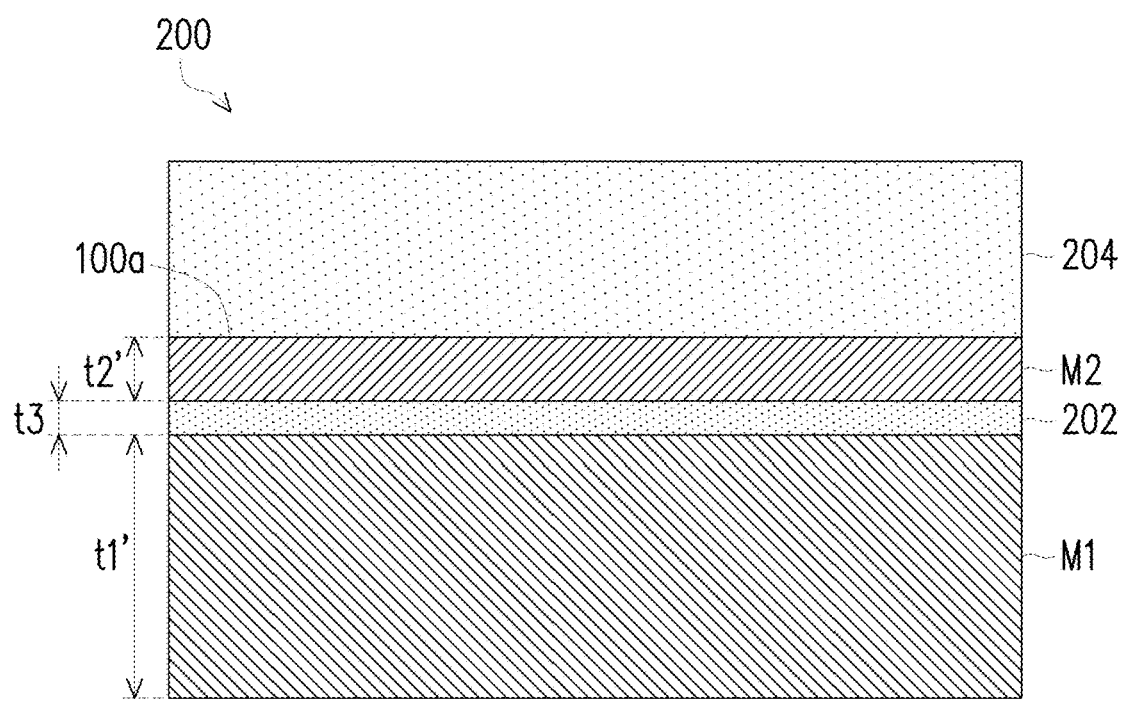
FIG. 2 is a schematic cross-sectional view of a composite metal foil according to a second embodiment of the disclosure.

FIG. 2 is a schematic cross-sectional view of a composite metal foil according to a second embodiment of the disclosure, where the same element symbols as those of the first embodiment are used to represent the same or similar film layers or portions, and descriptions of the same film layers or portions are not repeated.

Referring to FIG. 2, a composite metal foil 200 not only has the first metal layer M1 and the second metal layer M2, but also includes an alloy layer 202 formed between the first metal layer M1 and the second metal layer M2. The first metal layer M1 is basically composed of a first metal element, and the second metal layer M2 is basically composed of a second metal element, so that the alloy layer 202 may be formed by alloying the first metal layer M1 and the second metal Layer M2. In this case, a content ratio between the first metal element and the second metal element in the alloy layer 202 may have a gradient distribution along a thickness direction, where the content of the first metal element close to the first metal layer M1 in the alloy layer 202 is greater than the content of the second metal element, and the content of the second metal element close to the second metal layer M2 in the alloy layer 202 is greater than the content of the first metal element. In the second embodiment, a thickness t3 of the alloy layer 202 is, for example, 5 nm to 100 nm. A thickness t2' of the second metal layer M2 is, for example, 5 nm to 500 nm; in an embodiment, the thickness t2' is, for example, 5 nm to 400 nm. A thickness t1' of the first metal layer M1 is, for example, 3 μm to 30 μm. Moreover, a protection layer 204 may be disposed on the surface 100a of the second metal layer M2 to protect the surface 100a from environmental influences. In an embodiment, the protection layer 204 is derived from chromic acid, benzotriazole (BTA), carboxy benzotriazole (CBTA), or methylbenzotriazole (MBTA).

Figure 3:
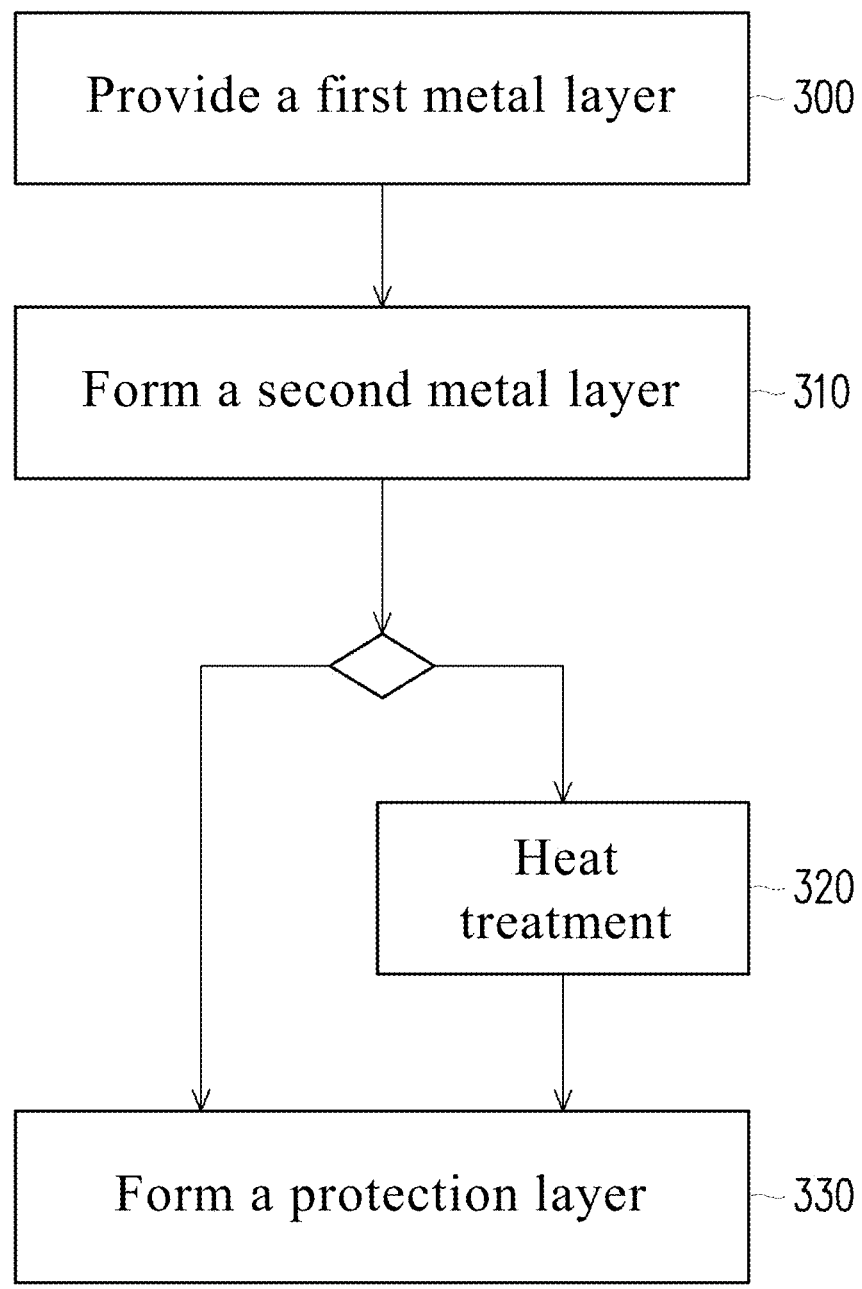
FIG. 3 is a flowchart of a manufacturing process of a composite metal foil according to a third embodiment of the disclosure.

FIG. 3 is a flowchart of a manufacturing process of a composite metal foil according to a third embodiment of the disclosure.

Referring to FIG. 3, in step 300, a first metal layer is provided, where the first metal layer is a copper foil, a nickel foil, a stainless steel foil, or a combination of thereof.

Then, in step 310, a second metal layer is formed on the surface of the first metal layer by electroplating, where a contact angle between the surface of the second metal layer and the liquid lithium metal is less than 90 degrees. The second metal layer is, for example, tin (Sn), indium (In), silver (Ag), zinc (Zn), zinc oxide (ZnO), zinc alloy, tin alloy, indium alloy, or a combination thereof. During the formation of the second metal layer, the first metal layer and the second metal layer may be alloyed to form an alloy layer between the first metal layer and the second metal layer.

For example, if the second metal layer is zinc (Zn), the first metal layer and the second metal layer may be alloyed at room temperature after electroplating. In other examples, if the second metal layer is composed of metal elements other than Zn, step 320 may be performed to carry out heat treatment in an environment of 60° C. to 180° C. for 1 to 10 minutes, so that the first metal layer and the second metal layer are alloyed.

Then, step 330 may be executed to use a dipping method or a coating method to form a protection layer on the surface of the second metal layer, where a solution for forming the protection layer is, for example, chromic acid, benzotriazole (BTA), carboxybenzotriazole (CBTA), or methylbenzotriazole (MBTA).

Several experiments are listed below to verify effects of the disclosure, but these experiments and their results are not intended to limit a scope of application of the disclosure.

Preparation Example

Step 1: copper plating solution ($Cu^{2+}$: 60 g/L, $H_2SO_4$: 90 g/L, 30 ppm, Tianhong company DP-111L additive) was prepared and heat to 40° C., a rotational speed of a rotating column electrode was controlled at 800 rpm, and electroplating was performed for 48 seconds at a current density of 50 A/$dm^2$ to obtain 8 μm high-strength base copper.

Step 2: the rotating column electrode containing base copper in step 1 was washed with water, and was put into (various) lithiophilic metal electroplating solutions in Table 1 below according to a difference of metal elements of the second metal layer (which is referred to as "lithiophilic coating" hereinafter), a speed was controlled at 800 rpm, and a thickness of the lithiophilic coating was controlled by a current density and an electroplating time shown in Table 1.

TABLE 1

| Material of lithiophilic coating | Component of electroplating solution | Current density (A/$dm^2$) | Thickness of lithiophilic coating |
|---|---|---|---|
| Zinc | Zn 5 g/L($ZnSO_4$), $CH_3COONa$ 10 g/L, pH 3.5-4.5 | 1 | 30-90 |
| Indium | $In_2(SO_4)_3$ 0.15M, $Na_2SO_4$ 20 g/L, citric acid 0.1M | 0.1 | 25-55 |
| Silver | $AgNO_3$ 3.2 g/L, dimethylhydantoin 14 g/L, KCl 1.6 g/L, pH 9.5 | 0.2 | 40-55 |
| Tin | $SnCl_2 \cdot 2H_2O$ 22.6 g/L, $K_4P_2O_7$ 119 g/L, geltin 1 g/L, pH 8.6 | 0.4 | 15-40 |

Step 3: the sample of step 2 was washed with water, and was immersed in an antioxidant layer (1.3 g/L $CrO_3$(aq)) solution.

Step 4: the sample was dried and removed from the rotating column electrode.

Examples 1 to 7

The composite metal foils of the embodiments 1 to 7 were basically prepared according to the method of the aforementioned preparation example, and differences were listed in Table 2 below.

Examples 8, 9, 11

The same preparation method as in the example 6 was adopted, but before step 3, heat treatment was respectively carried out in an environment of 140° C. and 180° C. for 10 minutes.

Detailed preparation conditions of the composite metal foils of examples 8, 9, 11 were also recorded in Table 2 below.

Example 10

The same preparation method as in example 3 was adopted, but the formed lithiophilic coating was thicker and before step 3, heat treatment was carried out in an environment of 180° C. for 10 minutes.

Detailed preparation conditions of the composite metal foil of example 10 were also recorded in Table 2 below.

Comparative Example

The same preparation method as the aforementioned preparation example was adopted, but the above-mentioned step 2 was not performed. Detailed preparation conditions were also recorded in Table 2.

TABLE 2

| | Material of lithiophilic coating | Material of antioxidant layer | Temperature of heat treatment (° C.) | Thickness of lithiophilic coating (nm) |
|---|---|---|---|---|
| Comparative example | — | Chromic acid | — | — |
| Example 1 | Zinc | Chromic acid | — | 30 |
| Example 2 | Zinc | Chromic acid | — | 60 |
| Example 3 | Indium | Chromic acid | — | 25 |
| Example 4 | Indium | Chromic acid | — | 55 |
| Example 5 | Silver | Chromic acid | — | 55 |
| Example 6 | Tin | Chromic acid | — | 15 |
| Example 7 | Tin | Chromic acid | — | 40 |
| Example 8 | Tin | Chromic acid | 140 | 15 |
| Example 9 | Tin | Chromic acid | 180 | 15 |
| Example 10 | Indium | Chromic acid | 180 | 40 |
| Example 11 | Tin | Chromic acid | 180 | 40 |

[Structure and Component Analysis]

Figure 4A:
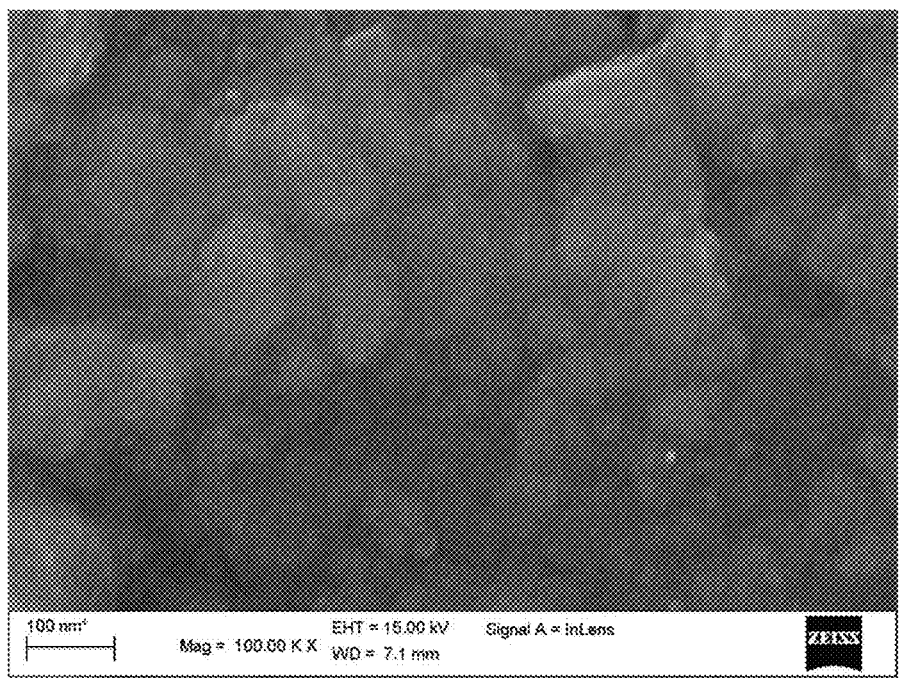
FIG. 4A is a SEM image of a surface of the comparative example.
Figure 4B:
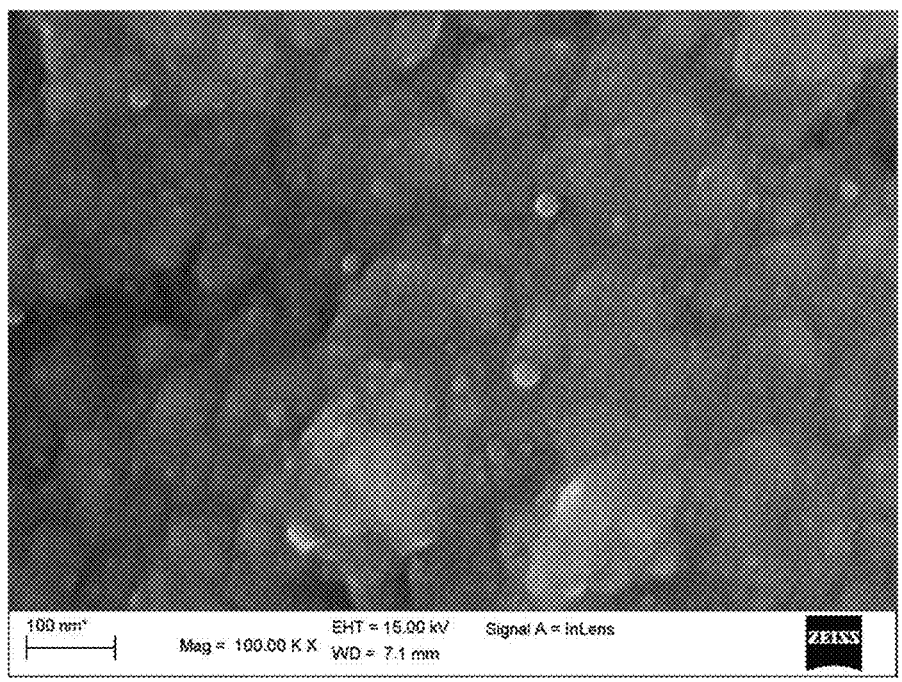
FIG. 4B is a SEM image of a surface of the composite metal foil of example 11.

A scanning electron microscope (SEM) was used to observe surface structures of the composite metal foils of the comparative example and the example 11, and obtained FIG. 4A and FIG. 4B.

FIG. 4A was a SEM image of a surface of the comparative example, and FIG. 4B was a SEM image of a surface of the composite metal foil of example 11. By comparing the two figures, it may be observed that the lithiophilic coating (tin layer) formed through electroplating on the high-strength base copper was composed of several metal particles discontinuously distributed on a surface of the high-strength base copper, and each metal particle was island-shaped or irregular.

Figure 5:
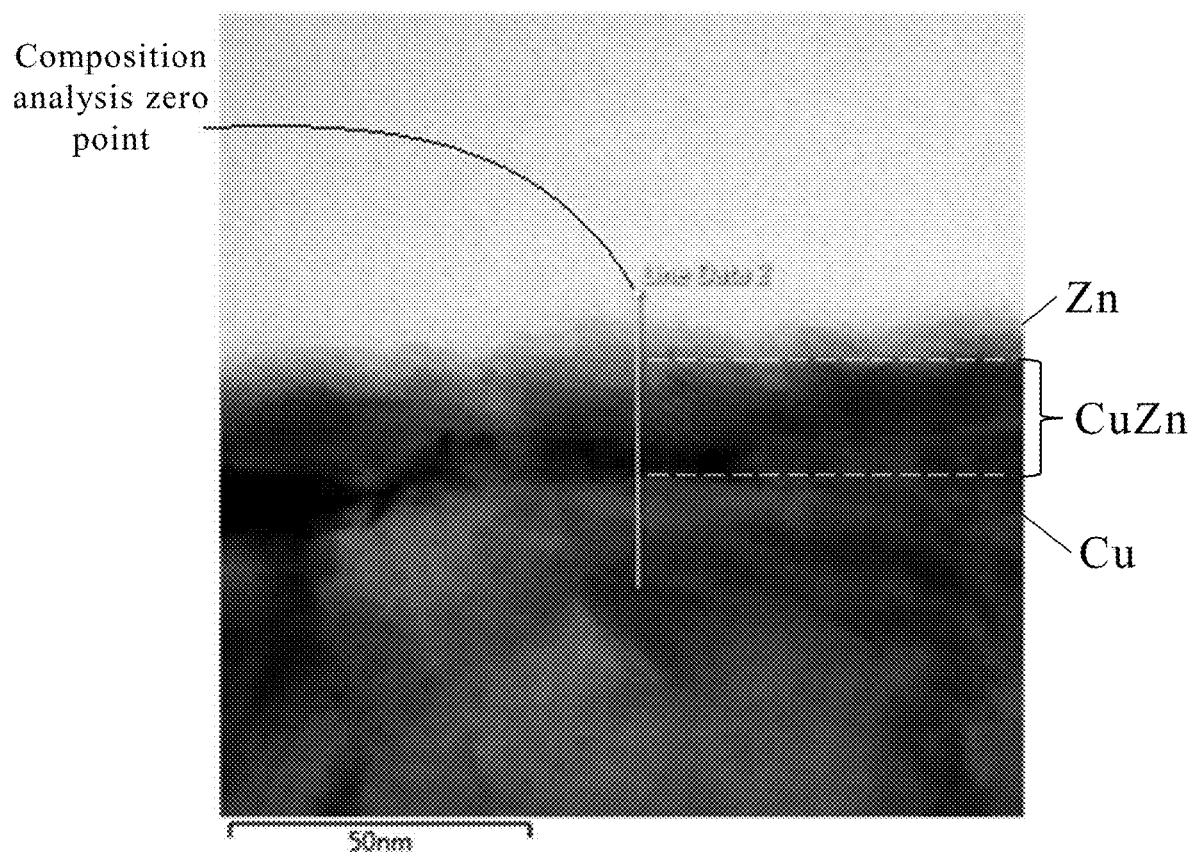
FIG. 5 is a TEM image of the composite metal foil of example 1.
Figure 6:
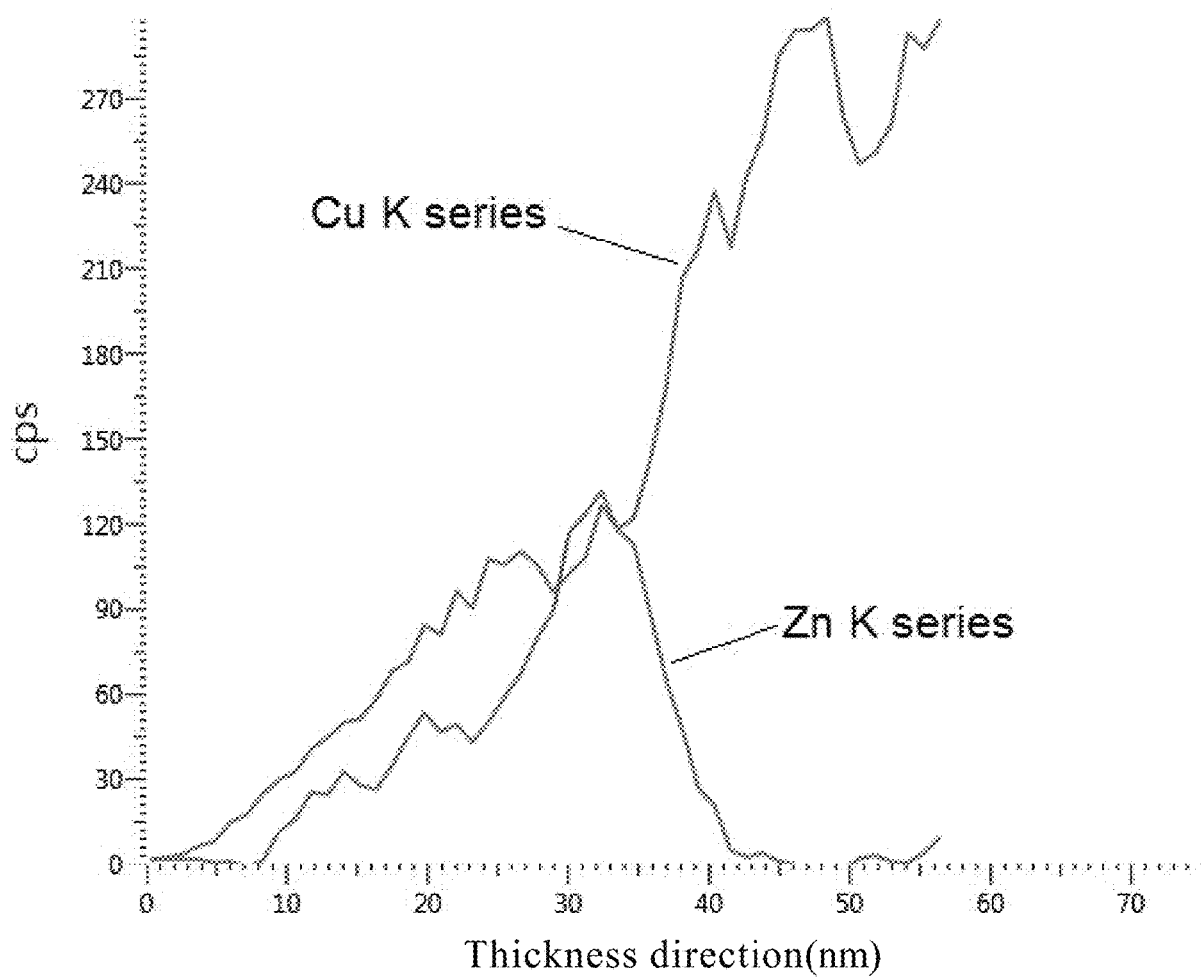
FIG. 6 is a curve graph showing composition of the composite metal foil of example 1.

Moreover, composition analysis of the composite metal foil in Example 1 was carried out by using a transmissive electron microscope (TEM) to obtain FIG. 5 and FIG. 6.

FIG. 5 was a TEM image of the composite metal foil of example 1. FIG. 6 was a curve graph showing composition of the composite metal foil of example 1. From FIG. 5, it may be observed that a darker alloy layer (CuZn) was formed between the high-strength base copper (Cu) and the lithiophilic coating (Zn). With reference of the curve graph of FIG. 6, a content ratio between Cu and Zn in the alloy layer (CuZn) has a gradient distribution along a thickness direction, and the content of Cu close to the high-strength base copper (Cu) was greater than the content of Zn, and the content of Zn close to the lithiophilic coating (Zn) was greater than the content of Cu.

[Contact Angle Measurement Method]

The base copper of the comparative example and the composite metal foils of examples 1 to 11 adopt following conditions and steps to measure the contact angle of its surface to the liquid lithium metal, and the results were shown in Table 3 below.

1. The whole process was carried out in a glove box ($O_2$<100 ppm).
2. A titanium foil and the base copper (or composite metal foil) were placed side by side on a heating plate, and a temperature of the heating plate was controlled at 210° C. (Li melting point 185° C.).
3. Oxide on a surface of a lithium foil was first removed with a scraper.
4. The lithium foil in step 3 was placed on the titanium foil and twist into a spherical shape (Li and Ti will not form an alloy).
5. After the lithium foil was melted into a metal ball, the lithium metal ball was moved to the surface of the base copper (or composite metal foil) with a dipper, and the contact angle was measured within 10 seconds.

[Copper Lithium Half-Cell Analysis]

Lithium copper half-cell test used a CR2032-type button cell, electrolyte was obtained by dissolving two lithium salts of lithium difluoro(oxalato) borate (LiDFOB), and lithium tetrafluoroborate (LiBF4) in carbonate ester solvent, an separator was Celgard2320 (PP/PE/PP), the high-strength base copper of the comparative example and the composite metal foils of examples 1 to 11 were used as working electrodes, the lithium metal foil was used as a counter electrode, and a charge and discharge current density was set to 0.5 to 2 mA/cm$^2$, a charge capacity was 0.5 to 5 mAh/cm$^2$, and a discharge cut-off potential was set to 0.5 to 2 V.

Coulombic efficiency (CE, with a unit of %) and nucleation overpotential ($V_{nu}$, with a unit of V) measured after the test may be used as electrical indicators for judging the lithiophilic coating, and the results were also shown in Table 3 below. The nucleation overpotential may be calculated according to a following equation 1. The nucleation overpotential was defined as a difference between the lowest point of the nucleation overpotential generated by lithium deposition on the surface of the negative electrode and an equilibrium potential; a first cycle coulombic efficiency and an average coulombic efficiency may be calculated according to a following equation 2.

Equation 1. nucleation overpotential (interface impedance)

$$\Delta V_{nu} = V_{nu} - V_{SS}$$

$V_{nu}$: lowest point of nucleation potential (V)

$V_{SS}$: lithium deposition stable potential

Equation 2. average coulombic efficiency $$CE = \frac{nQ_{DC} + Qs}{nQ_{Cc} + Q_p} \times 100\%$$

CE: coulombic efficiency (%)

Qs: discharge capacity (mAh)

Qp: charging capacity $Q_{CC}$: small charging capacity $Q_{CD}$: small discharging capacity

TABLE 3

| | Material of lithiophilic coating | Thickness of lithiophilic coating (nm) | Contact angle (°) | Average coulombic efficiency (%) | First cycle coulombic efficiency (%) | Nucleation overpotential $\Delta V_{nu}$ (mV) |
|---|---|---|---|---|---|---|
| Comparative example | — | — | 134 | 97.96 | 94.89 | 83.8 |
| Example 1 | Zinc | 30 | 74 | 98.25 | 97.22 | 8.2 |
| Example 2 | Zinc | 60 | 61 | 98.04 | 96.01 | 6.1 |
| Example 3 | Indium | 25 | 44 | 98.85 | 97.69 | 28.1 |
| Example 4 | Indium | 55 | 33 | 98.19 | 95.83 | 34.7 |
| Example 5 | Silver | 55 | 40 | 98.43 | 98.06 | 43 |
| Example 6 | Tin | 15 | 52 | 97.23 | 91.56 | 17.3 |
| Example 7 | Tin | 40 | 40 | 96.54 | 97.61 | 35.1 |
| Example 8 | Tin | 15 | 41 | 98.17 | 96.26 | 57.8 |
| Example 9 | Tin | 15 | 35 | 98.53 | 97.17 | 24.1 |
| Example 10 | Indium | 40 | 41 | 98.26 | 96.78 | 31.9 |
| Example 11 | Tin | 40 | 51 | 98.38 | 95.57 | 8.3 |

It may be seen from Table 3 that the lithiophilic coating may effectively reduce the nucleation overpotential, which means that the impedance of lithium deposition to a current collector is decreased. Moreover, structural stability may be improved through heat treatment, and both of the first cycle coulombic efficiency and the average coulombic efficiency are improved.

[Lithium Dendrite Observation]

The lithium-copper half-cell used in the above-mentioned lithium-copper half-cell test was charged once, and then a scanning electron microscope (SEM) was used to observe a surface morphology of lithium on the surface of the high-strength base copper and the surface of the lithiophilic coating.

[Observation Result 1]

Figure 7:
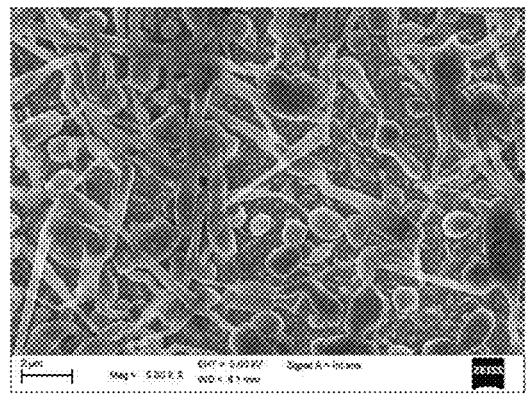
FIG. 7 is SEM images of the metal foil of the comparative example and the composite metal foils of examples 1 to 2 after once charging.
Figure 7:
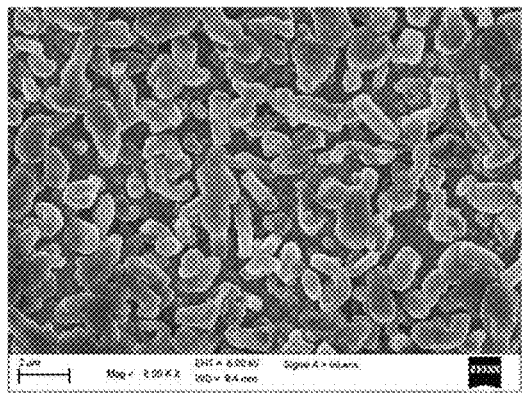
Figure 7:
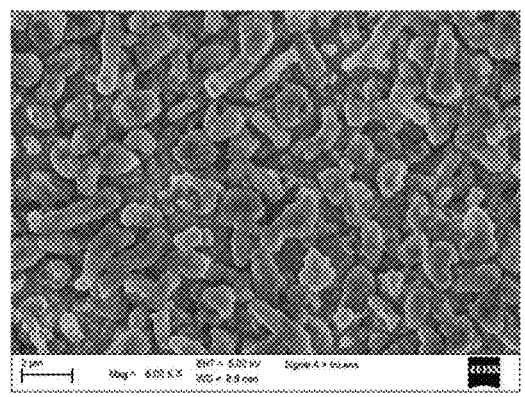

FIG. 7 is SEM images of the composite metal foils of the comparative example and examples 1 to 2, and description is made with reference of the nucleation overpotential of Table 4 below.

TABLE 4

| | Nucleation overpotential $\Delta V_{nu}$ (mV) |
|---|---|
| Comparative example | 83.8 |
| Embodiment 1 (Zn 30 nm) | 8.2 |
| Embodiment 2 (Zn 60 nm) | 6.1 |

It may be seen from Table 4 that the zinc coating may effectively suppress the nucleation overpotential and reduce the interface impedance of lithium deposition to the current collector. Then, compared with the SEM image analysis results in FIG. 7, it is shown that after zinc coating treatment, formation of dendritic lithium dendrites may be reduced, and dense lithium deposits in a shape of pebbles may be formed instead, which may improve safety of cell.

[Observation Result 2]

Figure 8:
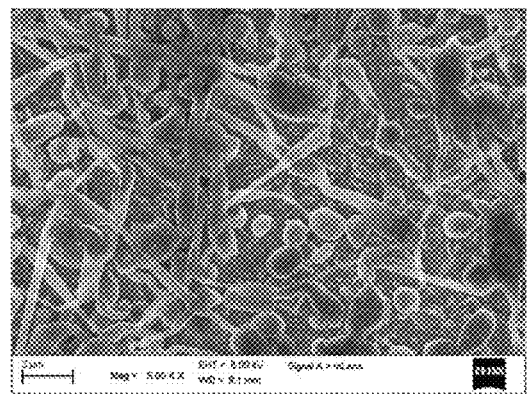
FIG. 8 is SEM images of the metal foil of the comparative example and the composite metal foils of examples 3 to 4 after once charging.
Figure 8:
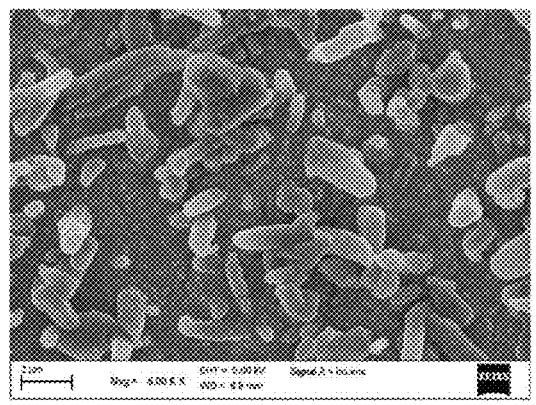
Figure 8:
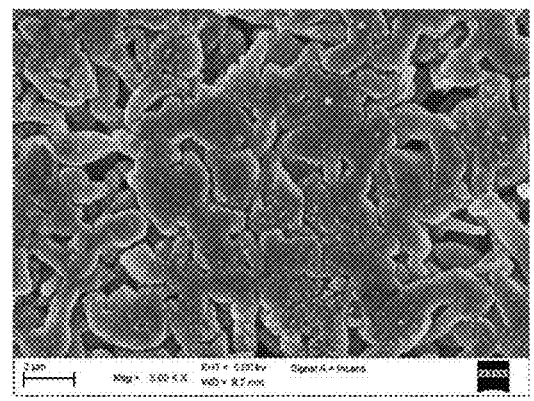

FIG. 8 is SEM images of the composite metal foils of the comparative example and examples 3 to 4, and description is made with reference of the nucleation overpotential of Table 5 below.

TABLE 5

| | Nucleation overpotential $\Delta V_{nu}$ (mV) |
|---|---|
| Comparative example | 83.8 |
| Embodiment 3 | 28.1 |
| Embodiment 4 | 34.7 |

It may be seen from the test results that the indium coating with a thickness of 25 to 55 nm may effectively suppress the nucleation overpotential and reduce the interface impedance of lithium deposition to the current collector. Then, compared with the SEM image analysis results in FIG. 8, it is shown that after indium coating treatment, formation of dendritic lithium dendrites may be reduced, and mossy dense lithium deposits may be formed instead, which may improve safety.

[Observation Result 3]

Figure 9:
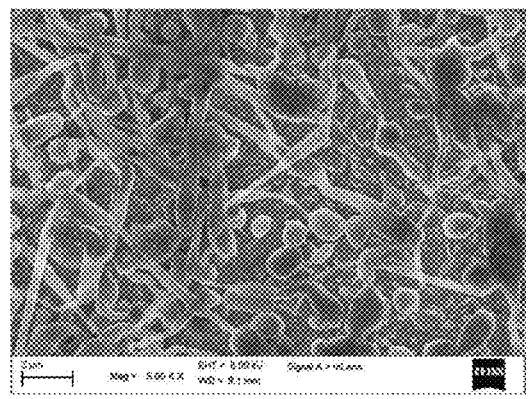
FIG. 9 is SEM images of the metal foil of the comparative example and the composite metal foil of example 5 after once charging.
Figure 9:
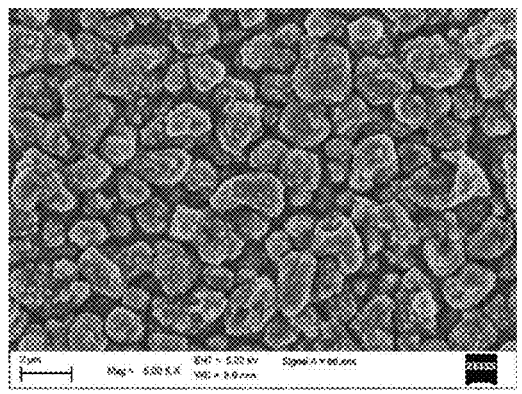

FIG. 9 is SEM images of the composite metal foils of the comparative example and example 5, and description is made with reference of the nucleation overpotential of Table 6 below.

TABLE 6

| | Nucleation overpotential $\Delta V_{nu}$ (mV) |
|---|---|
| Comparative example | 83.8 |
| Example 3 | 43 |

It may be seen from the test results that the silver coating may effectively suppress the nucleation overpotential and reduce the interface impedance of lithium deposition to the current collector. Then, compared with the SEM image analysis results in FIG. 9, it is shown that after silver coating treatment, formation of dendritic lithium dendrites may be reduced, and spherical dense lithium deposits may be formed instead, which may improve safety.

[Observation Result 4]

Figure 10:
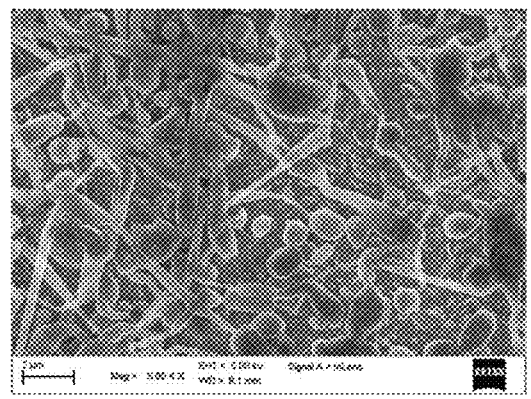
FIG. 10 is SEM images of the metal foil of the comparative example and the composite metal foils of examples 6 to 7 after once charging.
Figure 10:
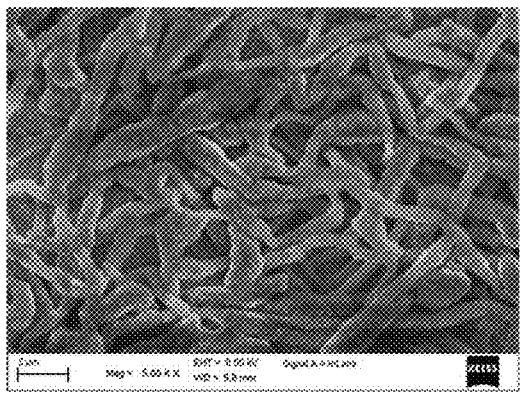
Figure 10:
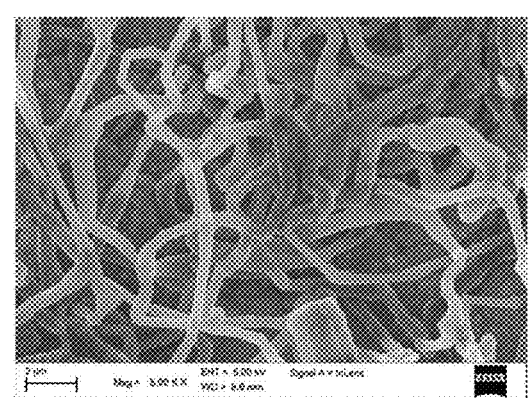

FIG. 10 is SEM images of the composite metal foils of the comparative example and examples 6 to 7, and description is made with reference of the nucleation overpotential of Table 7 below.

TABLE 7

| | Nucleation overpotential $\Delta V_{nu}$ (mV) |
|---|---|
| Comparative example | 83.8 |
| Example 6 | 17.3 |
| Example 7 | 35.1 |

It may be seen from the test results that the tin coating with a thickness of 15 to 40 nm may effectively suppress the nucleation overpotential, and the tin coating with a thickness of 15 nm has the lowest nucleation overpotential, which means that the interface impedance of lithium deposition to the current collector is the lowest. Then, compared with the SEM image analysis results in FIG. 10, it shows that after tin coating treatment, lithium deposition tends to be strip-like dendrites, which are more densely stacked than copper foil dendritic dendrites, and the safety is relatively high.

Based on the above observation results, it may be seen that the lithium deposition morphology formed by zinc coating, silver coating and indium coating is close to spherical-mossy so that the nucleation overpotential is significantly lower than that of comparative example, which may greatly reduce interface impedance of lithium deposition to the copper foil.

[Observation Result 5]

Figure 11:
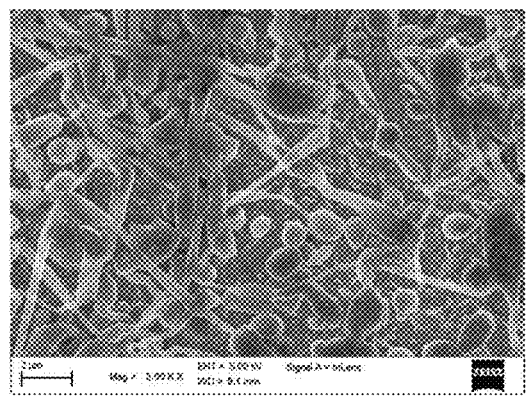
FIG. 11 is SEM images of the metal foil of the comparative example and the composite metal foil of examples 10 after once charging.
Figure 11:
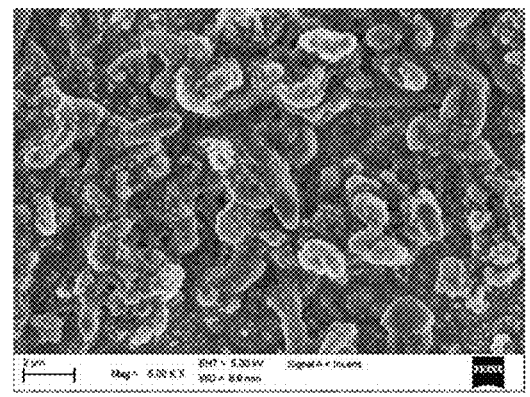

FIG. 11 is SEM images of the composite metal foils of the comparative example and example 10, and description is made with reference of the nucleation overpotential of Table 8 below.

TABLE 8

| | Nucleation overpotential $\Delta V_{nu}$ (mV) |
|---|---|
| Comparative example | 83.8 |
| Example 10 | 31.9 |

It may be seen from the test results that the nucleation overpotential of the indium coating with a thickness of 40 nm is reduced after heat treatment, and the morphology of lithium deposition is mossy stack.

[Observation Result 6]

Figure 12:
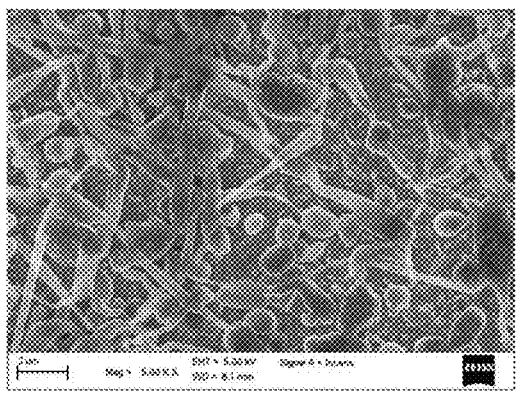
FIG. 12 is SEM images of the metal foil of the comparative example and the composite metal foils of examples 6, 8, 9, and 11 after once charging.
Figure 12:
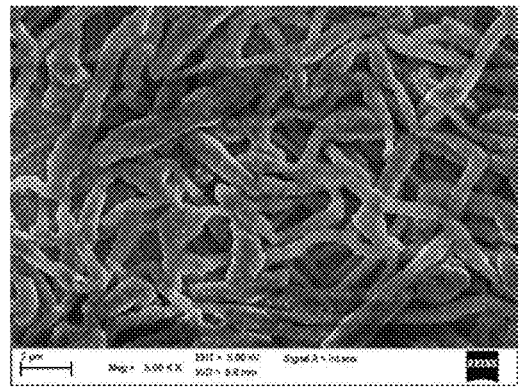
Figure 12:
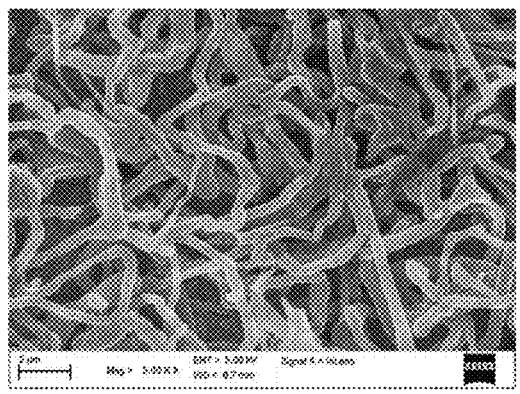
Figure 12:
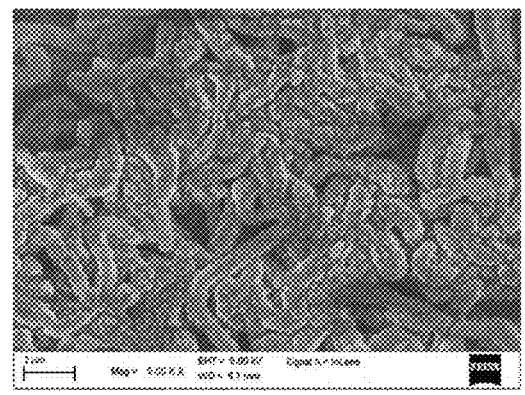
Figure 12:
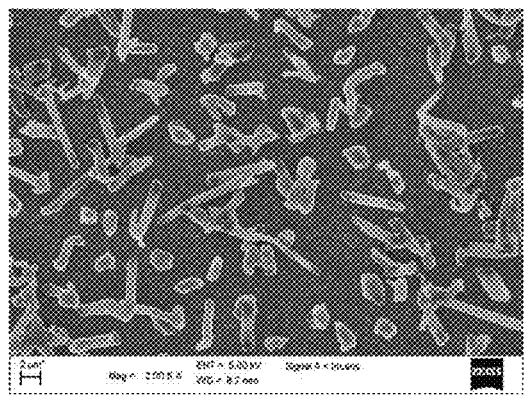

FIG. 12 is SEM images of the composite metal foils of the comparative example and examples 6, 8, 9, and 11, and description is made with reference of the nucleation overpotential of Table 9 below.

TABLE 9

| | Nucleation overpotential $\Delta V_{nu}$ (mV) |
|---|---|
| Comparative example | 83.8 |
| Example 6 | 17.3 |
| Example 8 | 57.8 |
| Example 9 | 24.1 |
| Example 11 | 8.3 |

It may be seen from the test results that although the nucleation overpotential of the tin coating is increased slightly after heat treatment, the morphology of the lithium deposition is still strip-like stack, but the nucleation overpotential is still lower than that of the comparative example, indicating that the existence of the tin coating may reduce the interface impedance of lithium deposition to the current collector. Moreover, the nucleation overpotential is the lowest when the thickness of the tin coating is increased to 40 nm, which means that the interface impedance of lithium deposition to the current collector is the lowest. Then, compared to the SEM images of example 9 and example 11 in FIG. 12, it is shown that the tin coating after heat treatment and having thicker thickness may avoid formation of lithium dendrites, and a deposition area is scattered, and the safety is relatively high.

In summary, in the disclosure, by electroplating a layer of lithiophilic metal on the surface of the first metal layer, the nucleation overpotential is reduced and generation of lithium dendrites is suppressed, which is suitable for applications where the negative electrode of the lithium cell is lithium metal or the lithium cell is an anode-free lithium metal cell.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A composite metal foil, comprising:
a first metal layer, being a copper foil, a nickel foil, a stainless steel foil, or a combination thereof;
a second metal layer, disposed on a surface of the first metal layer, wherein the second metal layer comprises Sn, In, Ag, Zn, zinc alloy, tin alloy, indium alloy, or a combination thereof; and
an alloy layer, formed between the first metal layer and the second metal layer, wherein
a contact angle of a surface of the second metal layer to liquid lithium metal is lower than 90 degrees, wherein the contact angle is obtained by placing a titanium foil and the composite metal foil on a heating plate at 210° C., placing a lithium foil on the titanium foil and twisting into a spherical shape, and after the lithium foil was melted into a metal ball, moving the metal ball to a surface of the composite metal foil followed by measuring the contact angle within 10 seconds, and
the first metal layer is composed of a first metal element, the second metal layer is composed of a second metal element, and the alloy layer is formed by alloying the first metal layer and the second metal layer, wherein a thickness of the second metal layer is 5 nm to 500 nm, and
a surface roughness Rz of the composite metal foil is ≤2 μm.

2. The composite metal foil according to claim 1, wherein a content ratio between the first metal element and the second metal element in the alloy layer has a gradient distribution along a thickness direction, content of the first metal element close to the first metal layer in the alloy layer is greater than content of the second metal element, and the content of the second metal element close to the second metal layer in the alloy layer is greater than the content of the first metal element.

3. The composite metal foil according to claim 1, wherein a thickness of the alloy layer is 5 nm to 100 nm.

4. The composite metal foil according to claim 1, wherein a thickness of the first metal layer is 3 μm to 30 μm.

5. The composite metal foil according to claim 1, wherein the second metal layer is composed of a plurality of metal particles discontinuously distributed on the surface of the first metal layer, and each of the metal particles is island-shaped or irregular.

6. The composite metal foil according to claim 1, further comprising a protection layer disposed on the surface of the second metal layer.

7. The composite metal foil according to claim 6, wherein the protection layer is derived from chromic acid, benzotriazole (BTA), carboxy benzotriazole (CBTA), or methylbenzotriazole (MBTA).

* * * * *